US012584000B2

(12) United States Patent
Wu et al.

(10) Patent No.: US 12,584,000 B2
(45) Date of Patent: **\*Mar. 24, 2026**

(54) REDUCED GRAPHENE OXIDE NITRILE RUBBER AND METHOD FOR PREPARING TOOTH-SCAR-FREE TOOTH BLOCK

(71) Applicant: Jianhu Kaitai Petroleum Machinery Co., Ltd., Yancheng city (CN)

(72) Inventors: Lizhong Wu, Yancheng city (CN); Dongfeng Li, Yancheng City (CN)

(73) Assignee: Jianhu Kaitai Petroleum Machinery Co., Ltd., Yancheng city (CN)

( * ) Notice: Subject to any disclaimer, the term of this patent is extended or adjusted under 35 U.S.C. 154(b) by 896 days.

This patent is subject to a terminal disclaimer.

(21) Appl. No.: 17/757,517

(22) PCT Filed: Mar. 24, 2021

(86) PCT No.: PCT/CN2021/082666
§ 371 (c)(1),
(2) Date: Jun. 16, 2022

(87) PCT Pub. No.: WO2022/037060
PCT Pub. Date: Feb. 24, 2022

(65) Prior Publication Data
US 2023/0015419 A1 Jan. 19, 2023

(30) Foreign Application Priority Data
Aug. 19, 2020 (CN) .......................... 202010836971.5

(51) Int. Cl.
*C08K 13/02* (2006.01)
(52) U.S. Cl.
CPC .................................... *C08K 13/02* (2013.01)

(58) Field of Classification Search
CPC .. C08K 13/02; C08K 3/042; C08K 2201/014; E21B 19/16; C08L 9/02; C08L 2205/025; C08L 2205/03
See application file for complete search history.

(56) References Cited

U.S. PATENT DOCUMENTS

2014/0087977 A1    3/2014  Kim et al.
2021/0061962 A1*   3/2021  Vautard .................... C08L 7/00
(Continued)

FOREIGN PATENT DOCUMENTS

CN        101558455 A      10/2009
CN        105037830 A      11/2015
(Continued)

*Primary Examiner* — Mark Eashoo
*Assistant Examiner* — Zhen Liu
(74) *Attorney, Agent, or Firm* — Sisson & Banyas, Attorneys at Law, LLC; Jeffrey J. Banyas

(57) ABSTRACT

Disclosed is a reduced graphene oxide nitrile rubber, comprising the following components in parts by weight: 100-140 parts of nitrile rubber, 30-90 parts of a reduced graphene oxide nitrile rubber masterbatch, 1.8-2.52 parts of a vulcanizing agent, 1.2-1.68 parts of a vulcanization accelerator, 5-7 parts of a vulcanization activator, 17-23.8 parts of a plasticizer, 2-2.8 parts of antioxidant, 59-86.6 parts of a filler, 0.1-0.14 parts of a curing agent, and 2-2.8 parts of dichlorophenol. The reduced graphene oxide nitrile rubber has excellent mechanical properties, a wide applicable temperature range, and strong stability in use, which excellently addresses the poor mechanical properties of the nitrile rubber in the prior art due to high temperature in use and the interfacial compatibility issue between the filler and the rubber.

7 Claims, 1 Drawing Sheet

(56)                    References Cited

U.S. PATENT DOCUMENTS

| | | | | |
|---|---|---|---|---|
| 2021/0095103 A1* | 4/2021 | Ma | ........................... | C08K 5/13 |
| 2023/0002593 A1* | 1/2023 | Wu | ........................... | C08L 9/02 |

FOREIGN PATENT DOCUMENTS

| | | | |
|---|---|---|---|
| CN | 105097066 | A | 11/2015 |
| CN | 107022121 | A | 8/2017 |
| CN | 107418069 | A | 12/2017 |
| CN | 109370071 | A | 2/2019 |
| CN | 109370119 | A | 2/2019 |
| CN | 110343299 | A | 10/2019 |
| CN | 110483861 | A | 11/2019 |
| WO | 2019132866 | A1 | 7/2019 |

* cited by examiner

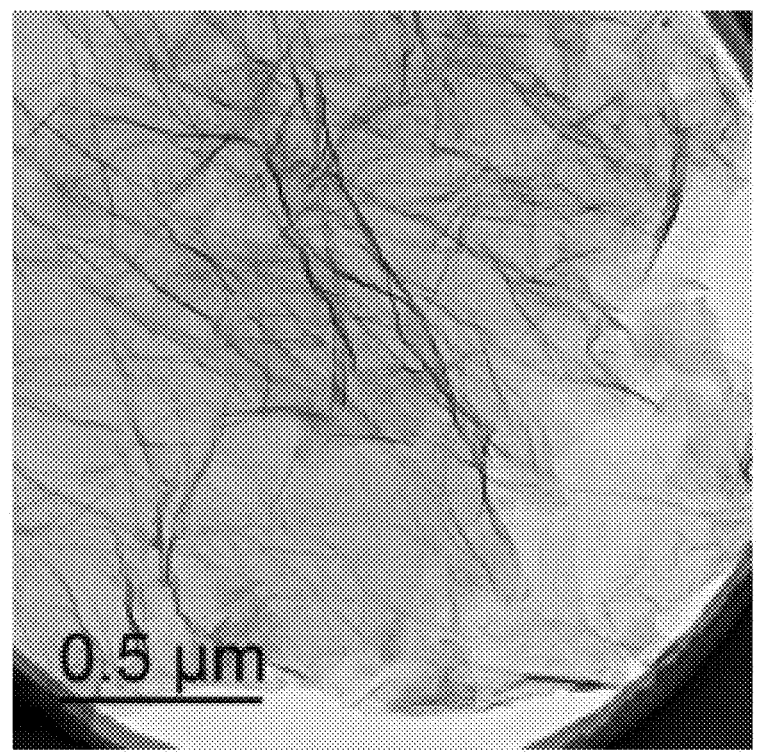

REDUCED GRAPHENE OXIDE NITRILE RUBBER AND METHOD FOR PREPARING TOOTH-SCAR-FREE TOOTH BLOCK

The present disclosure claims the priority from the International Application No. PCT/CN2021/082666, filed to the WIPO on Mar. 24, 2021, titled "Preparation Method for Reduced Graphene Oxide Nitrile Rubber and for Tooth Block Without Tooth Marks" and the Chinese Patent Application No. 202010836971.5, filed to the CNIPA on Aug. 19, 2020, titled "Reduced Graphene Oxide Nitrile Rubber And Method for Preparing Tooth-Scar-Free Tooth Block", each of which is incorporated herein by reference in its entirety.

TECHNICAL FIELD

The present disclosure relates to a reduced graphene oxide nitrile rubber and a method for preparing a tooth-scar-free tooth block, which can be used to manufacture hydraulic tongs for down-hole oil and gas production.

BACKGROUND

For a long time, a failure accident of a drilling tool, in particular a malignant fracture failure accident of a down-hole drilling tool, has always been threatening the drilling safety of the oil and gas well and the improvement of comprehensive benefits. Statistics over the years show that in the failure accidents of drilling tools, the failure of drilling tool joints and threads accounts for about 80% of the failure accidents of drilling tools, and the economical loss cannot be underestimated.

Through a large number of failure analysis and research, it is found that most of the failures of drilling tools are due to the wear of the joints and threads of the drilling tools, which reduces the torsional strength of the connections and fails under the action of alternating bending stress. Due to the limited length of the joint of the drill pipe, the main tongs clamp the pipe body to buckle and unbuckle, the buckle torque is large, and the tooth scars of the main tongs will become larger. Among the various surface scars on the drill pipe, the tooth scars of the main tongs are the most common and serious, which can easily form stress concentration points and induce the failure of the joints and threads of the drilling tools. Therefore, it is a basic problem that cannot be ignored to reduce the tooth scars damage on the drill pipe body caused by the tongs.

Nitrile rubber is a copolymer obtained by emulsion polymerization of butadiene and acrylonitrile, and there is a strong polar cyano group on the molecular chain, and it is known for excellent oil resistance. Nitrile rubber as an oil-resistant rubber is widely used in the manufacture of oil-resistant products such as sealing articles, gaskets and the like. However, the nitrile rubber used as a protective tooth block in the drill tongs cannot meet the requirement of on-site working conditions, the high temperature environment will accelerate the aging process of the nitrile rubber, which will cause the rubber to be excessively cross-linked and reduce the hardness, tensile strength and other properties. Therefore, it is of great significance in the practice to prepare nitrile rubber with better mechanical behavior of temperature resistance and aging resistance.

Chinese Patent CN110117390A discloses a graphene oxide modified antioxidant, a thermal oxygen aging resistance rubber containing the same and a preparation method thereof. The method utilizes organosilane and graphene oxide to perform dehydration condensation reaction, and the obtained product reacts with a sulfydryl antioxidant to modify nitrile rubber, and the heat resistance and aging resistance properties of the modified nitrile rubber are improved over the unmodified nitrile rubber. However, this method is not economical, and more products are generated during the reaction, the proportion of active ingredients cannot be explicitly defined, and the operation steps of this method are relatively complex, and has no applicability and universality.

Therefore, after the nitrile rubber in the related art is aged by thermal oxygen, the mechanical properties such as hardness and tensile strength will be reduced, and the compatibility problem will occur at the interface of the filler and the rubber.

SUMMARY

In order to overcome the reduction of mechanical properties of the existing nitrile rubber such as hardness and tensile strength after thermal oxidation aging and the compatibility problem at the interface of the filler and the rubber, the present disclosure provides a reduced graphene oxide nitrile rubber and a method for preparing tooth-scar-free tooth block, which enables the nitrile rubber and the manufactured tooth-scar-free tooth block to have better mechanical properties such as hardness and tensile strength, and the interface between the filler and the rubber can be more compatible.

The present disclosure relates to a reduced graphene oxide nitrile rubber, comprising the following components in parts by weight: 100-140 parts of nitrile rubber, 30-90 parts of reduced graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer, 2-2.8 parts of antioxidant, 59-86.6 parts of filler, 0.1-0.14 part of curing agent and 2-2.8 parts of dichlorophenol.

Wherein, the plasticizer may be a mixture of stearic acid, dibutyl phthalate and tricresyl phosphate with a mass ratio of 1.5-2.5:8-12:4-6; the antioxidant may be a mixture of antioxidant D and antioxidant 4010 with a mass ratio of 1:1; the filler can be a mixture of air-mixed carbon black, semi-reinforced furnace black and epoxy resin E44 with a mass ratio of 32-37:18-22:3-5; the mass fraction of the reduced graphene oxide in the reduced graphene oxide nitrile rubber masterbatch is 30-57%, and the range of the oxygen content in the reduced graphene oxide is 1.2-1.4%, the carbon content is 98-99%, and the specific surface area is 750-800m$^2$/g.

The present disclosure further relates to a reduced graphene oxide modified tooth-scar-free tooth block, which is made of the reduced graphene oxide nitrile rubber as described above, and the preparation process comprises the following steps:

(1) weighing the components according to the formula of the reduced graphene oxide nitrile rubber as described above for later use;

(2) plasticating nitrile rubber to obtain a plasticated rubber;

(3) sequentially adding dichlorophenol, a vulcanizing agent, a vulcanization activator, a plasticizer, an antioxidant and a filler into the plasticated rubber obtained in step (2), and uniformly mixing to obtain a premixed rubber compound;

(4) cooling the premixed rubber compound obtained in step (3), then adding a reduced graphene oxide nitrile rubber masterbatch and a curing agent, uniformly mixing to obtain a mixed rubber compound;

(5) cooling the mixed rubber compound obtained in step (4), then adding a vulcanization accelerator and uniformly mixing, adding a sheet to obtain a mixed rubber sheet;

(6) blanking the mixed rubber sheet obtained in step (5) according to the size and shape of the tooth block mold, wherein the pressing force of the mold in the vulcanization process is 25-27 MPa, the temperature is maintained at 175-180° C., and the pressing time is 5-6 h; after completing the vulcanization, opening the mold and taking out the booth block;

(7) after taking out the booth block, trimming and shaping in time.

The reduced graphene oxide nitrile rubber and the method for preparing the tooth-scar-free tooth block provided by the present disclosure is simple in process and low in cost. By adding the reduced graphene oxide and the epoxy resin in the formula, the prepared reduced graphene oxide modified nitrile rubber tooth block has excellent mechanical properties, a wide range of applicable temperatures and strong using stability, and solves the problem of poor mechanical properties and interface compatibility between the filler and the rubber due to the high using temperature of the nitrile rubber in the related art.

mixture of stearic acid, dibutyl phthalate and tricresyl phosphate with a mass ratio of 1.5-2.5:8-12:4-6, preferably 2:10:5; the antioxidant may be a mixture of antioxidant D and antioxidant 4010 with a mass ratio of 1:1; the filler may be a mixture of gas-mixture carbon black, semi-reinforcing furnace black, and epoxy resin E44, the mass ratio thereof may be 32-37:18-22:3-5, the preferred mass ratio is 35:20:4; and the curing agent may be maleic anhydride.

The oxygen content, the carbon content, and the specific surface area of the reduced graphene oxide all affect the performance of the graphene. When the oxygen content is high and the carbon content is low, it means that the graphene does not have a high reduction degree, and the graphene can still maintain some characteristics of the graphene oxide, but the intrinsic characteristics of the graphene cannot be completely represented; and the size of the specific surface area affects the dispersion of the graphene in the rubber matrix and the interface compatibility between the graphene and the rubber matrix. In some embodiments, the oxygen content in the reduced graphene oxide is 1.2-1.4%, the carbon content is 98-99%, and the specific surface area is 750-800 $m^2/g$. The reduced graphene oxide used in the present disclosure with an oxygen content of 1.33%, a carbon content of 98.67%, and a specific surface area of 787.752 $m^2/g$ can not only ensure the performance of graphene's intrinsic properties, but also have better dispersibility and interface compatibility. A combination of these three parameters with respect to the reduced graphene oxide is not present in the related art.

| Type of Graphene | Oxygen Content % | Carbon Content % | Specific Surface Area($m^2$/g) | Moisture Permeability of Graphene Modified Epoxy Coating (g/$m^2$ · Day) |
|---|---|---|---|---|
| Reduced Graphene Oxide(Present Disclosure) | 1.33 | 98.67 | 787.752 | 5.5528 |
| Reduced Graphene Oxide 1# | 3.11 | 92.74 | 566.372 | 11.9443 |
| Reduced Graphene Oxide 2# | 2.62 | 95.28 | 453.289 | 10.3172 |

The datas in the table above are the three parameters of different reduced graphene oxide tested and the moisture permeability of the modified epoxy coating, from which can be seen that the combination of the three parameters of the reduced graphene oxide used in the present disclosure is best. The larger the specific surface area is, the better the labyrinth effect formed in the rubber is. It can be seen from the moisture permeability that the larger the specific surface area is, the better the corrosion resistance of the modified product is, which can prolong the life span of the product.

The reduced graphene oxide in the present disclosure is not subjected to modification treatment, so that the original state of the graphene is maintained, various properties of the reduced graphene oxide are not changed, and the intrinsic properties of the graphene will not be reduced due to modification. Therefore, the mechanical properties of the modified rubber can also be improved by using a suitable dispersant to disperse the reduced graphene oxide uniformly in the rubber matrix. When the reduced graphene oxide is uniformly dispersed in the nitrile rubber system, the motion capability of the molecular chain in the nitrile rubber is

BRIEF DESCRIPTION OF THE DRAWINGS

FIG. 1 is a transmission electron microscope photograph of a reduced graphene oxide.

DETAILED DESCRIPTION

A first aspect of the present disclosure provides a reduced graphene oxide nitrile rubber, comprising the following components in parts by weight: 100-140 parts of nitrile rubber, 30-90 parts of reduced graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer, 2-2.8 parts of antioxidant, 59-86.6 parts of filler, 0.1-0.14 part of curing agent and 2-2.8 parts of dichlorophenol (DCP).

Wherein, the mass fraction of reduced graphene oxide in the reduced graphene oxide nitrile rubber masterbatch may be 30-57%; the vulcanizing agent may be sulfur; the vulcanization accelerator may be accelerator DM; the vulcanization activator may be zinc oxide; the plasticizer may be a largely limited by the sheet-like reduced graphene oxide having a large specific surface area, so that the nitrile rubber exhibits a relatively high using temperature range. Moreover, the intrinsic strength of the graphene reaches 130 GPa, the fracture strain is about 25%, and the elastic modulus can reach 1.1 TPa. The tensile strength of the graphene can be up to 42 N/$m^2$, which is about 100 times that of the ordinary steel calculated by the two-dimensional strength limit theory. The experimental results show that the mechanical properties of the tooth blocks made of reduced graphene oxide nitrile rubber have been significantly improved. During high temperature vulcanization, the epoxy resin and the curing agent undergo in-situ polymerization in the rubber compound to form nanoscale particles or fibers, or to form a local interpenetrating network structure with the rubber molecules, and the comprehensive performance of the rubber compound is improved. The epoxy resin as an interface additive between the non-polar unsaturated rubber, the filler and the graphene oxide, forms a bridge function at the interface between the filler and the rubber, and the dispersion degree and the reinforcing effect of the filler are improved.

The preparation method of the reduced graphene oxide nitrile rubber masterbatch comprises the following steps: dispersing reduced graphene oxide in 1,4-butanediol glycidyl ether dispersant, ultrasonically dispersing for 60-90 minutes to obtain a reduced graphene oxide dispersion, adding nitrile rubber latex and stirring for 90-120 min to obtain a mixed solution, wherein the mass of the reduced graphene oxide accounts for 11-18% of the mass of the reduced graphene oxide nitrile rubber masterbatch. The mixed solution above is added to a mixed liquid of a calcium chloride aqueous solution and ethanol with a volume ratio of 1:2-4 used as a coagulation solution for demulsification, wherein the volume ratio of the mixed solution to the coagulation solution is 2-3:3-5, after suction filtration, washing and drying, a reduced graphene oxide nitrile rubber masterbatch is obtained. The solid content of the nitrile rubber latex may be 45-46%.

A second aspect of the present disclosure relates to a tooth-scar-free tooth block made of reduced graphene oxide nitrile rubber, which is made of the reduced graphene oxide nitrile rubber as described above, and the preparation process comprises the following steps:

(1) weighing the components according to the formula of the reduced graphene oxide nitrile rubber as described above for later use;

(2) plasticating nitrile rubber to obtain a plasticated rubber;

(3) sequentially adding dichlorophenol, a vulcanizing agent, a vulcanization activator, a plasticizer, an antioxidant and a filler into the plasticated rubber obtained in step (2), and uniformly mixing to obtain a premixed rubber compound;

(4) cooling the premixed rubber compound obtained in step (3), then adding a reduced graphene oxide nitrile rubber masterbatch, a curing agent and uniformly mixing to obtain a mixed rubber compound;

(5) cooling the mixed rubber compound obtained in step (4), then adding a vulcanization accelerator and uniformly mixing, adding a sheet to obtain a mixed rubber sheet;

(6) blanking the mixed rubber sheet obtained in step (5) according to the size and shape of the tooth block mold, wherein the pressing force of the mold in the vulcanization process is 25-27 MPa, the temperature is maintained at 175-180° C., and the pressing time is 5-6 h;

after completing the vulcanization, opening the mold and taking out the booth block;

(7) after taking out the booth block, trimming and shaping in time.

The present disclosure will be further described in detail below with reference to specific examples.

Example 1

A tooth-scar-free tooth block of reduced graphene oxide nitrile rubber, using reduced graphene oxide nitrile rubber as the raw material, comprising the following components in parts by weight:

100 parts of nitrile rubber, 30 parts of reduced graphene oxide nitrile rubber masterbatch, 1.8 parts of vulcanizing agent, 1.2 parts of vulcanization accelerator, 5 parts of vulcanization activator, 17 parts of plasticizer, 2 parts of antioxidant, 59 parts of filler, 0.1 part of curing agent and 2 parts of dichlorophenol (DCP).

Wherein, the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; the filler is gas-mixture carbon black, semi-reinforcing furnace black and epoxy resin E44 with a mass ratio of 35:20:4; and the curing agent can be maleic anhydride.

A method for preparing a tooth-scar-free tooth block of reduced graphene oxide nitrile rubber, comprising the following steps:

(1) weighing the components according to the above formula for later use;

(2) adding nitrile rubber raw rubber to an open mill for plasticization for 15 min to obtain a plasticated rubber;

(3) adding dichlorophenol, a vulcanizing agent, a vulcanization activator, a plasticizer, an antioxidant and a filler into the obtained plasticated rubber, and uniformly mixing to obtain a premixed rubber compound;

(4) after cooling the premixed rubber compound obtained in step (3), adding a reduced graphene oxide nitrile rubber masterbatch and a curing agent, and uniformly mixing to obtain a mixed rubber compound; after cooling, adding a vulcanization accelerator, and then adding a sheet to obtain a mixed rubber sheet;

(5) blanking the mixed rubber sheet obtained in step (4) according to the size and shape of the tooth block mold, adding the vulcanization accelerator for vulcanization, wherein the pressing force of the mold in the vulcanization process is 25° C. the temperature is maintained at 175° C., and the pressing time is 5 h; after completing vulcanization, opening the mold and taking out the tooth block product.

Example 2

A tooth-scar-free tooth block of reduced graphene oxide nitrile rubber, using reduced graphene oxide nitrile rubber as the raw material, comprising the following components in parts by weight:

120 parts of nitrile rubber, 60 parts of reduced graphene oxide nitrile rubber masterbatch, 2 parts of vulcanizing agent, 1.5 parts of vulcanization accelerator, 6.5 parts of vulcanization activator, 20 parts of plasticizer, 2.5 parts of antioxidant, 70 parts of filler, 0.12 part of curing agent and 2.5 parts of dichlorophenol (DCP).

Wherein, the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; the filler is gas-mixture carbon black, semi-reinforcing furnace black and epoxy resin E44 with a mass ratio of 35:20:4; and the curing agent can be maleic anhydride.

A method for preparing a tooth-scar-free tooth block of reduced graphene oxide nitrile rubber, comprising the following steps:

(1) weighing the components according to the above formula for later use;

(2) adding nitrile rubber raw rubber to an open mill for plasticization for 15 min to obtain a plasticated rubber;

(3) adding dichlorophenol, a vulcanizing agent, a vulcanization activator, a plasticizer, an antioxidant and a filler into the obtained plasticated rubber, and uniformly mixing to obtain a premixed rubber compound;

(4) after cooling the premixed rubber compound obtained in step (3), adding a reduced graphene oxide nitrile rubber masterbatch and a curing agent, and uniformly mixing to obtain a mixed rubber compound; after cooling, adding a vulcanization accelerator, and then adding a sheet to obtain a mixed rubber sheet;

(5) blanking the mixed rubber sheet obtained in step (4) according to the size and shape of the tooth block mold, wherein the pressing force of the mold in the vulcanization process is 26 MPa, the temperature is maintained at 175° C., and the pressing time is 5 h; after vulcanization, opening the mold and taking out the tooth block.

Example 3

A tooth-scar-free tooth block of reduced graphene oxide nitrile rubber, using reduced graphene oxide nitrile rubber as the raw material, comprising the following components in parts by weight:

110 parts of nitrile rubber, 50 parts of reduced graphene oxide nitrile rubber masterbatch, 2.1 parts of vulcanizing agent, 1.4 parts of vulcanization accelerator, 5.5 parts of vulcanization activator, 21 parts of plasticizer, 2.3 parts of antioxidant, 60 parts of filler, 0.12 part of curing agent and 2.3 parts of dichlorophenol (DCP).

Wherein, the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; the filler is gas-mixture carbon black, semi-reinforcing furnace black and epoxy resin E44 with a mass ratio of 35:20:4; and the curing agent can be maleic anhydride.

A method for preparing a tooth-scar-free tooth block of reduced graphene oxide nitrile rubber, comprising the following steps:

(1) weighing the components according to the above formula for later use;

(2) adding nitrile rubber raw rubber to an open mill for plasticization for 15 min to obtain a plasticated rubber;

(3) adding dichlorophenol, a vulcanizing agent, a vulcanization activator, a plasticizer, an antioxidant and a filler into the obtained plasticated rubber, and uniformly mixing to obtain a premixed rubber compound;

(4) after cooling the premixed rubber compound obtained in step (3), adding a reduced graphene oxide nitrile rubber masterbatch and a curing agent, and uniformly mixing to obtain a mixed rubber compound; after cooling, adding a vulcanization accelerator, and then adding a sheet to obtain a mixed rubber sheet;

(5) blanking the mixed rubber sheet obtained in step (4) according to the size and shape of the tooth block mold, wherein the pressing force of the mold in the vulcanization process is 26 MPa, the temperature is maintained at 180° C., and the pressing time is 5.5 hours; after vulcanization, opening the mold and taking out the tooth block.

Comparative Example 1

A modified nitrile rubber, comprising the following components in parts by weight:

85 parts of nitrile rubber, 1.7 parts of vulcanizing agent, 2 parts of vulcanization accelerator, 3 parts of vulcanization activator, 3 parts of plasticizer, 1.5 parts of antioxidant and 30 parts of filler Wherein, the nitrile rubber is carboxyl nitrile rubber, the content of bound acrylonitrile in the carboxyl nitrile rubber is 33-40%, the content of carboxyl is 3-5%; the vulcanizing agent is benzoyl peroxide, the vulcanization accelerator is 1.2 parts of N-oxodiethylidene-2-benzothiazole subsulfonamide and 0.8 parts of zinc diethyldithiocarbamate; the vulcanization activator is zinc oxide; the plasticizer is dioctyl azelate; the antioxidant is 2,2,4-trimethyl -1.2-dihydroquinoline polymer; and the filler is a furnace carbon black with an average particle size of 11-25 nm.

The preparation method comprises the following steps:

S1. weighing the components according to the above formula for later use;

S2. performing segmented plasticization of the nitrile rubber on an open mill, controlling the roller temperature to 35° C., the roller distance to 0.5 mm, the plasticization time to 25 minutes, parking for 4 h between each segment, and repeating the plasticization for three times to obtain a plasticated rubber;

S3. controlling the roller temperature to 35° C., using a 3 mm small roller distance, and alternately adding a vulcanizing agent, a vulcanization activator, a plasticizer, an antioxidant and a filler in the plasticated rubber obtained in step S2, and mixing uniformly to obtain a premixed rubber compound;

S4. after cooling the premixed rubber compound obtained in step S3, thinning the premixed rubber compound for 20 times, wrapping the rubber to form a triangular rubber bag for 15 times until uniformly mixed, obtaining a mixed rubber compound;

S5. cooling the mixed rubber compound obtained in step S4, then adding a vulcanization accelerator and uniformly mixing, adding a sheet to obtain a mixed rubber sheet;

S6. parking the mixed rubber sheet obtained in step S5 for 12 h, then placing in a flat vulcanizing instrument, vulcanizing at 155° C. for 90 min to obtain a modified nitrile rubber.

Comparative Example 2

A nitrile rubber, comprising the following raw material components in parts by weight:

70 parts of nitrile rubber, 30 parts of graphene oxide modified antioxidant nitrile rubber masterbatch I, 0.5 part of sulfur, 1 part of stearic acid, 1 part of zinc oxide, 0.5 part of vulcanization activator Z311, 30 parts of carbon black, 1 part of tetramethylthiuram disulfide and 1 part of zinc dimethyldithiocarbamate.

The preparation method of the nitrile rubber described above comprises the following steps:

(1) adding a nitrile rubber raw rubber to an open mill for plasticization for 15 min to obtain a plasticated rubber;

(2) adding a vulcanizing agent, a vulcanization accelerator, a vulcanization activator, a surfactant and a reinforcing agent into the plasticated rubber and mixing, adding a graphene oxide modified antioxidant nitrile rubber masterbatch I, thinning for 17 times, wrapping the rubber to form a triangular rubber bag for 10 times, then adding a sheet to obtain a mixed rubber sheet;

(3) vulcanizing the mixed rubber sheet at 155° C. with a vulcanization time of t90, to obtain a thermal and oxidative aging resistance rubber.

Comparative Example 3

A nitrile rubber, comprising the following raw material components in parts by weight:

70 parts of nitrile rubber, 30 parts of graphene oxide modified antioxidant nitrile rubber masterbatch, 0.5 part of sulfur, 1 part of stearic acid, 1 part of zinc oxide, 0.5 part of vulcanization activator Z311, 30 parts of carbon black, 1 part of tetramethylthiuram disulfide and 1 part of zinc dimethyldithiocarbamate.

The preparation method of the nitrile rubber described above comprises the following steps:

(1) adding a nitrile rubber raw rubber to an open mill for plasticization for 15 min to obtain a plasticated rubber;

(2) adding a vulcanizing agent, a vulcanization accelerator, a vulcanization activator, a surfactant and a reinforcing agent into the plasticated rubber and mixing, adding a graphene oxide modified antioxidant nitrile rubber masterbatch I, thinning for 17 times, wrapping the rubber to form a triangular rubber bag for 10 times, then adding a sheet to obtain a mixed rubber sheet;

(3) vulcanizing the mixed rubber sheet at 155° C. with a vulcanization time of t90, to obtain a thermal and oxidative aging resistance rubber.

Referring to FIG. 1, it is shown a transmission electron microscope image of the reduced graphene oxide used in Example 3, in which the graphene sheets are lighter in color, looser, and fluffy.

The modified rubber tooth block prepared in Example 3 and the modified nitrile rubber prepared in Comparative Examples 1-3 were tested as follows:

1. Tensile Strength: According to the test method specified in GB/T528-1998 "Determination of Tensile Stress-Strain Properties of Vulcanized Rubber or Thermoplastic Rubber", testing the elongation at break of the sample;

2. Shore hardness: According to the test method specified in GB/T531.1-2008 "Test Method for Indentation Hardness of Vulcanized Rubber or Thermoplastic Rubber Part 1 Shore Durometer Method (Shore Hardness)", testing the Shore hardness of the sample;

The results are shown in table below.

| Test Results | Comparative Example 1 | Comparative Example 2 | Comparative Example 3 | Example 3 |
|---|---|---|---|---|
| Elongation at Break/% | 582.76 | 534.59 | 576.65 | 300 |

-continued

| Test Results | Comparative Example 1 | Comparative Example 2 | Comparative Example 3 | Example 3 |
|---|---|---|---|---|
| Shore Hardness/A | 65 | 61.17 | 60 | 78 |

As can be seen from the table, compared with the modified nitrile rubber prepared in Comparative Examples 1-3, the elongation at break of the reduced graphene oxide modified nitrile rubber prepared in Example 3 of the present disclosure is lower, and the Shore hardness is higher, indicating that the reduced graphene oxide modified nitrile rubber prepared in the embodiment of the present disclosure has good mechanical properties, small compression set, and good applicability to high temperature environments.

Although the embodiments disclosed in the present disclosure are as described above, the described content is merely used to facilitate understanding of the present disclosure, and is not intended to limit the present disclosure. Any modifications and variations can be made by those skilled in the art without departing from the spirit and scope of the present disclosure, but the scope of the patent protection of the present disclosure should still be subject to the scope defined by the appended claims.

The invention claimed is:

1. A reduced graphene oxide nitrile rubber, comprising the following components in parts by weight: 100-140 parts of nitrile rubber, 30-90 parts of reduced graphene oxide nitrile rubber masterbatch, 1.8-2.52 parts of vulcanizing agent, 1.2-1.68 parts of vulcanization accelerator, 5-7 parts of vulcanization activator, 17-23.8 parts of plasticizer, 2-2.8 parts of antioxidant, 59-86.6 parts of filler, 0.1-0.14 part of curing agent and 2-2.8 parts of dichlorophenol; wherein, a mass fraction of reduced graphene oxide in the reduced graphene oxide nitrile rubber masterbatch is 30-57%; the oxygen content in the reduced graphene oxide is 1.2-1.4%, the carbon content is 98-99%, and the specific surface area is 750-800 m$^2$/g;

wherein the preparation method of the reduced graphene oxide nitrile rubber masterbatch comprises the following steps; dispersing reduced graphene oxide in 1,4-butanediol glycidyl ether dispersant; ultrasonically dispersing for 60-90 minutes to obtain a reduced graphene oxide dispersion; adding nitrile rubber latex and stirring for 90-120 min to obtain a mixed solution; adding the mixed solution above to a mixed liquid of a calcium chloride aqueous solution and ethanol with a volume ratio of 1:2-4 used as a coagulation solution for demulsification, wherein the volume ratio of the mixed solution to the coagulation solution is 2-3:3-5; after suction filtration, washing and drying, obtaining a reduced graphene oxide nitrile rubber masterbatch.

2. The reduced graphene oxide nitrile rubber according to claim 1, wherein, comprising the following components in parts by weight: 100 parts of nitrile rubber, 30 parts of reduced graphene oxide nitrile rubber masterbatch, 1.8 parts of vulcanizing agent, 1.2 parts of vulcanization accelerator, 5 parts of vulcanization activator, 17 parts of plasticizer, 2 parts of antioxidant, 59 parts of filler, 0.1 part of curing agent and 2 parts of dichlorophenol;

wherein the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; and the filler is gas-mixture carbon black, semi-reinforcing furnace black and epoxy resin E44 with a mass ratio of 35:20:4; and the curing agent is maleic anhydride.

3. The reduced graphene oxide nitrile rubber according to claim 1, wherein, comprising the following components in parts by weight: 120 parts of nitrile rubber, 60 parts of reduced graphene oxide nitrile rubber masterbatch, 2 parts of vulcanizing agent, 1.5 parts of vulcanization accelerator, 6.5 parts of vulcanization activator, 20 parts of plasticizer, 2.5 parts of antioxidant, 70 parts of filler, 0.12 part of curing agent and 2.5 parts of dichlorophenol;

wherein, the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; the filler is gas-mixture carbon black, semi-reinforcing furnace black and epoxy resin E44 with a mass ratio of 35:20:4; and the curing agent is maleic anhydride.

4. The reduced graphene oxide nitrile rubber according to claim 1, comprising the following components in parts by weight: 110 parts of nitrile rubber, 50 parts of reduced graphene oxide nitrile rubber masterbatch, 2.1 parts of vulcanizing agent, 1.4 parts of vulcanization accelerator, 5.5 parts of vulcanization activator, 21 parts of plasticizer, 2.3 parts of antioxidant, 60 parts of filler, 0.12 part of curing agent and 2.3 parts of dichlorophenol;

wherein the vulcanizing agent is sulfur; the vulcanization accelerator is accelerator DM; the vulcanization activator is zinc oxide; the plasticizer is stearic acid, dibutyl phthalate and tricresyl phosphate with a mass ratio of 2:10:5; the antioxidant is a mixture of antioxidant D and antioxidant 4010 with a mass ratio of 1:1; the filler is gas-mixture carbon black, semi-reinforcing furnace black and epoxy resin E44 with a mass ratio of 35:20:4; and the curing agent is maleic anhydride.

5. The reduced graphene oxide nitrile rubber according to claim 1, wherein the plasticizer is a mixture of stearic acid, dibutyl phthalate and tricresyl phosphate with a mass ratio of 1.5-2.5:8-12:4-6.

6. The reduced graphene oxide nitrile rubber according to claim 1, wherein the antioxidant is a mixture of antioxidant D and antioxidant 4010 with a mass ratio of 1:1.

7. The reduced graphene oxide nitrile rubber according to claim 1, wherein the filler is a mixture of gas-mixture carbon black, semi-reinforcing furnace black and epoxy resin E44 with a mass ratio of 32-37:1822:3-5.

\* \* \* \* \*